US007523147B2

(12) United States Patent (10) Patent No.: US 7,523,147 B2
Hicks et al. (45) Date of Patent: Apr. 21, 2009

(54) METHOD AND SYSTEM FOR MANAGING INVENTORY FOR A MIGRATION USING HISTORY DATA

(75) Inventors: Scott D. Hicks, Underhill Center, VT (US); James A. Martin, Jr., Endicott, NY (US); Jamie P. Rigoni, Fairfax, VT (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 11/065,911

(22) Filed: Feb. 24, 2005

(65) Prior Publication Data

US 2006/0190487 A1 Aug. 24, 2006

(51) Int. Cl.
 G06F 17/30 (2006.01)
 G06F 9/44 (2006.01)
 G06F 11/00 (2006.01)
(52) U.S. Cl. .................. 707/204; 707/101; 707/102; 707/103 X; 707/104.1; 707/203; 717/168; 714/38
(58) Field of Classification Search .................. 707/10, 707/202, 204, 205, 101, 102, 103 Y, 104.1, 707/103 X, 203; 700/99; 706/21; 705/1, 705/36, 38, 6; 717/168, 171, 178; 726/2; 714/38
See application file for complete search history.

(56) References Cited

U.S. PATENT DOCUMENTS

| | | | |
|---|---|---|---|
| 6,199,204 B1 * | 3/2001 | Donohue .................... 717/178 |
| 6,502,102 B1 * | 12/2002 | Haswell et al. ............. 707/102 |
| 6,611,726 B1 * | 8/2003 | Crosswhite .................. 700/99 |
| 7,100,195 B1 * | 8/2006 | Underwood .................... 726/2 |
| 7,212,978 B2 * | 5/2007 | Kowal et al. ................... 705/1 |
| 7,213,007 B2 * | 5/2007 | Grichnik ...................... 706/21 |
| 7,216,343 B2 * | 5/2007 | Das et al. .................... 717/168 |
| 7,437,614 B2 * | 10/2008 | Haswell et al. ............... 714/38 |
| 2002/0077945 A1 | 6/2002 | Leymann et al. |
| 2004/0024675 A1 * | 2/2004 | Lahre et al. ................... 705/36 |
| 2004/0039688 A1 * | 2/2004 | Sulkowski et al. ............ 705/38 |
| 2004/0060044 A1 * | 3/2004 | Das et al. .................... 717/171 |
| 2008/0071588 A1 * | 3/2008 | Eder ............................. 705/7 |

FOREIGN PATENT DOCUMENTS

| | | |
|---|---|---|
| JP | 2004005075 A | 1/2004 |
| WO | WO 02/23797 A1 | 3/2002 |

OTHER PUBLICATIONS

Saleh E. Abdullahi et al., "Garbage collecting the Internet: A survey or distributed garbage collection", ACM, Sep. 1998, pp. 330-373.*
Bosun et al., "Mobility-based anomaly detection in cellular mobile networks", ACM, 2004, pp. 61-69.*

* cited by examiner

*Primary Examiner*—Thuy N Pardo
(74) *Attorney, Agent, or Firm*—Anna Linne; Hoffman Warnick LLC (57) ABSTRACT

The generation of an activity display for displaying history data for one or more migration values is provided. A history record that includes various modification attributes is generated each time the migration value is modified and stored as history data. One or more stored history records can be obtained from the history data and displayed to the user. When multiple history records are to be displayed, they can be categorized in a hierarchical structure based some of the modification attributes to enable a user to selectively display and navigate the history records.

29 Claims, 6 Drawing Sheets

UPDATE INVENTORY INFORMATION — 70

SITE [LOCATION A ▶]
PROJECT [MIGRATION A ▶]
MODEL NUMBER [COMPONENT A ▶]

TOTAL RECEIVED (DISTRIBUTOR) [69]
TOTAL RECEIVED (OTHER) [10]
TOTAL SENT [0]
PHYSICAL INVENTORY [30]
TOTAL ADJUSTMENTS [5]

← 72

[OK]
[CANCEL]
[UPDATE]

COMMENT: [            ] ← 74

FIG. 4

UPDATE FORECAST INFORMATION

ESTIMATED FORECAST INFORMATION

SITE          LOCATION A ▶
PROJECT       MIGRATION A ▶
MODEL NUMBER  COMPONENT A ▶

CURRENT MONTH -1   [ 0]
CURRENT MONTH      [ 0]
CURRENT MONTH +1   [ 0]
CURRENT MONTH +2   [ 0]
CURRENT MONTH +3   [ 0]
CURRENT MONTH +4   [ 0]
CURRENT MONTH +5   [ 0]
CURRENT MONTH +6   [10]
CURRENT MONTH +7   [15]
CURRENT MONTH +8   [15]
CURRENT MONTH +9   [15]

[OK]  [CANCEL]  [UPDATE]

COMMENT: [                    ]

ACTIVITY DISPLAY — 96B

| | |
|---|---|
| SITE | LOCATION A |
| PROJECT | MIGRATION A |
| ACTIVITY TYPE | INVENTORY |
| ACTIVITY | UPDATE TO PHYSICAL INVENTORY |
| COMPONENT | COMPONENT C |
| NEW VALUE | 25 |
| PREVIOUS VALUE | 43 |
| INDIVIDUAL | ANDERSON |
| TIMESTAMP | 01/10/2005 09:03:47 PM |
| COMMENT | -18 FOR SCHEDULED DEPLOYMENTS |

▼PREVIOUS ▲NEXT ▲HELP

US 7,523,147 B2

METHOD AND SYSTEM FOR MANAGING INVENTORY FOR A MIGRATION USING HISTORY DATA

BACKGROUND OF THE INVENTION

1. TECHNICAL FIELD

The invention relates generally to inventory management for a migration, such as an information technology migration, and more particularly, to a solution for storing and displaying a history of modifications to the inventory data and/or the forecast data of one or more components during the migration.

2. BACKGROUND ART

In information technology (IT), a "migration" is a change from one hardware and/or software technology to another. A migration may be performed for various reasons, and typically includes one or more hardware/software components being migrated (e.g., installed, removed, replaced, upgraded, patched, etc.) on one or more targets (e.g., computers, workstations, etc.). To this extent, a migration may synchronize the software/hardware for all users in a company, enable an IT infrastructure to accommodate more users, modernize the IT infrastructure, etc. For example, an entity (e.g., a company) may migrate each user's computer from one operating system (e.g., Windows® XP®) to another operating system (e.g., Linux®). In this case, the Linux® operating system is a key component of the migration, and having a sufficient number of copies of the Linux® operating system available for installation is essential in implementing the migration.

During a typical migration, each component is ordered and received into inventory at which time it can be deployed to a target. For example, for a migration from a token ring network to an ethernet network, each target will require installation of an ethernet card. To this extent, ethernet cards will be ordered for deployment to each target. For a large entity, such as International Business Machines of Armonk, N.Y.(IBM), the migration may take several months. In this case, it is desirable to periodically order and receive only a portion of the total components that will be required for the migration. This enables the entity to benefit from any drops in pricing, newly introduced products, etc., as well as spread the cost for the components and the migration over time.

In order to effectively order the components in this manner, an accurate forecast for the number of components that will be required needs to be maintained. For example, for each component, a total amount expected to be required for a particular time period (e.g., a month) can be maintained. Based on the forecast data, components can be ordered to ensure that a sufficient number are in inventory for deployment. To this extent, the order can be based on a lead time for the order to be processed. For example, a particular component may have a lead time of three months. As a result, an order would need to be placed to ensure sufficient inventory for at least the next three months.

For the migration, different individuals may be generating the forecasts, ordering the components, monitoring inventory, overseeing the entire migration, etc. As a result, various individuals may be changing forecast data, inventory data, and the like. In order to better understand the current values for forecast and/or inventory data, as well as any discrepancies that may be included, it would be beneficial to view a history of the modifications to the values for this data.

To date, there is no inventory management solution that displays history data for inventory data and/or forecast data for a particular component during a migration. To this extent, a need exists for an improved solution for managing the inventory of component(s) for the migration, in which a history of modifications to the inventory data and/or the forecast data of one or more components during the migration is obtained and an activity display is generated for displaying the history data to a user.

SUMMARY OF THE INVENTION

The invention provides an improved solution for managing inventory for a migration. In particular, the invention provides a solution that obtains history record(s) for one or more migration variables (e.g., forecast variable, inventory variable, or the like) and generates an activity display that includes a set of modification attributes for the history record (s). Each history record can be generated when the migration variable is modified. The history record includes one or more modification attributes for the modification. For example, the history record can include user information, a timestamp, information on the modified migration variable, a new and/or an old value, etc. In one embodiment, the activity display categorizes multiple history records based on some of the modification attributes. Regardless, a user can view the activity display to review the evolution of a current value for a particular migration variable. This can enable the user to determine the source of an error, review the progress of the migration, assess any inventory problems for a migration component, etc.

A first aspect of the invention provides a method of managing inventory for a migration, the method comprising: obtaining at least one migration component for the migration; obtaining a set of history records for a migration variable for the at least one migration component, wherein each history record in the set of history records corresponds to a unique modification of a value of the migration variable and includes a set of modification attributes associated with the unique modification; and generating an activity display for the migration, wherein the activity display includes the set of modification attributes for at least one of the set of history records.

A second aspect of the invention provides a method of managing inventory for a migration, the method comprising: obtaining a set of history records for the migration, wherein each history record in the set of history records comprises a plurality of modification attributes associated with a unique modification of a value of a migration variable; generating at least one hierarchical structure for categorizing the set of history records based on at least some of the plurality of modification attributes; and generating an activity display based on the at least one hierarchical structure.

A third aspect of the invention provides a system for managing inventory for a migration, the system comprising: a system for obtaining a set of history records for a migration variable for at least one migration component, wherein each history record in the set of history records corresponds to a unique modification of a value of the migration variable and includes a set of modification attributes associated with the unique modification; and a system for generating an activity display for the migration, wherein the activity display includes the set of modification attributes for at least one of the set of history records.

A fourth aspect of the invention provides a program product stored on a computer-readable medium, which when executed, manages inventory for a migration, the program product comprising: program code for obtaining a set of history records for a migration variable for at least one migration component, wherein each history record in the set of history records corresponds to a unique modification of a value of the migration variable and includes a set of modification attributes associated with the unique modification; and program code for generating an activity display for the migration, wherein the activity display includes the set of modification attributes for at least one of the set of history records.

A fifth aspect of the invention provides a method of deploying an application for managing inventory for a migration, the method comprising: providing a computer infrastructure being operable to: obtain a set of history records for a migration variable for at least one migration component, wherein each history record in the set of history records corresponds to a unique modification of a value of the migration variable and includes a set of modification attributes associated with the unique modification; and generate an activity display for the migration, wherein the activity display includes the set of modification attributes for at least one of the set of history records.

A sixth aspect of the invention provides computer software embodied in a propagated signal for managing inventory for a migration, the computer software comprising instructions to cause a computer system to perform the following functions: obtain a set of history records for a migration variable for at least one migration component, wherein each history record in the set of history records corresponds to a unique modification of a value of the migration variable and includes a set of modification attributes associated with the unique modification; and generate an activity display for the migration, wherein the activity display includes the set of modification attributes for at least one of the set of history records.

A seventh aspect of the invention provides a computer-readable medium that includes computer program code to enable a computer infrastructure to manage inventory for a migration.

An eighth aspect of the invention provides a business method for managing inventory for a migration.

A ninth aspect of the invention provides a method of generating a system for managing inventory for a migration.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for managing inventory for a migration. In particular, the invention provides a solution that obtains history record(s) for one or more migration variables (e.g., forecast variable, inventory variable, or the like) and generates an activity display that includes a set of modification attributes for the history record(s). Each history record can be generated when the migration variable is modified. The history record includes one or more modification attributes for the modification. For example, the history record can include user information, a timestamp, information on the modified migration variable, a new and/or an old value, etc. In one embodiment, the activity display categorizes multiple history records based on some of the modification attributes. Regardless, a user can view the activity display to review the evolution of a current value for a particular migration variable. This can enable the user to determine the source of an error, review the progress of the migration, assess any inventory problems for a migration component, etc.

Figure 1:
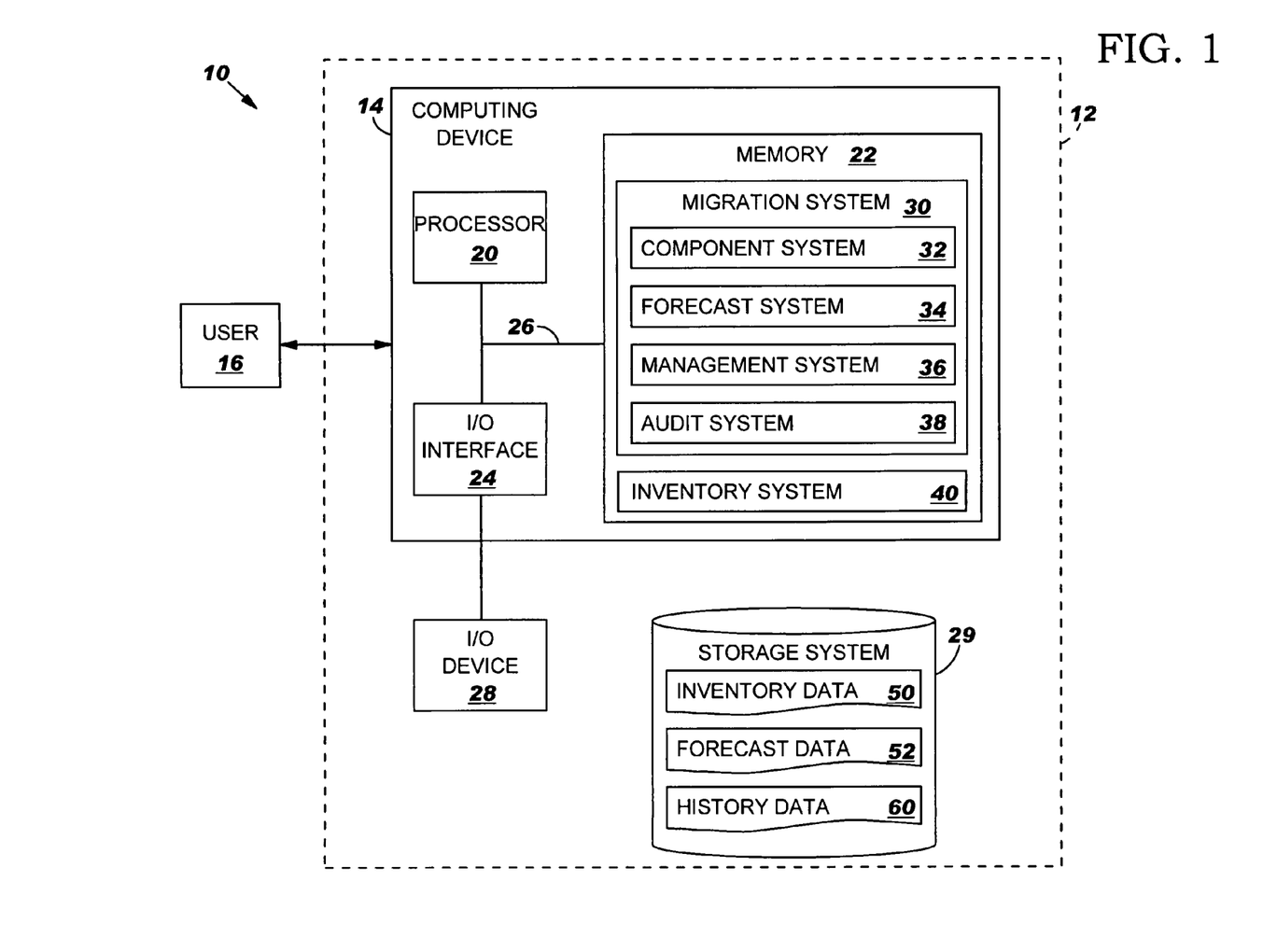
FIG. 1 shows an illustrative system for managing inventory for a migration.

Turning to the drawings, FIG. 1 shows an illustrative system 10 for managing inventory for a migration. To this extent, system 10 includes a computer infrastructure 12, which comprises a computing device 14 that can perform the various process steps described herein for managing inventory for a migration. In particular, computing device 14 is shown including a migration system 30 that enables computing device 14 to manage inventory for a migration by performing the process steps of the invention.

Computing device 14 is shown including a processor 20, a memory 22, an input/output (I/O) interface 24, and a bus 26. Further, computing device 14 is shown in communication with an external I/O device/resource 28 and a storage system 29. In general, processor 20 executes computer program code, such as migration system 30, that is stored in memory 22 and/or storage system 29. While executing computer program code, processor 20 can read and/or write data, such as history data 60, to/from memory 22, storage system 29, and/or I/O interface 24. Bus 26 provides a communication link between each of the components in computing device 14. I/O device 28 can comprise any device that enables user 16 to interact with computing device 14 (e.g., keyboard, pointing device, display, etc.) or any device that enables computing device 14 to communicate with one or more other computing devices (e.g., network card, modem, wireless communications device, etc.).

In any event, computing device 14 can comprise any general purpose computing article of manufacture capable of executing computer program code installed by a user 16 (e.g., a personal computer, server, handheld device, etc.). However, it is understood that computing device 14 and migration system 30 are only representative of various possible computing devices that may perform the various process steps of the invention. To this extent, in other embodiments, computing device 14 can comprise any specific purpose computing article of manufacture comprising hardware and/or computer program code for performing specific functions (e.g., a modem), any computing article of manufacture that comprises a combination of specific purpose and general purpose hardware/software (e.g., a mobile phone), or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over a network, via a shared memory, or the like, to perform the various process steps of the invention. In the former case, the network can comprise one or more types of networks (e.g., the Internet, a wide area network, a local area network, a virtual private network, etc.), and communications between the computing devices may utilize various types of communications links and/or transmission techniques (e.g., wired, wireless, etc.).

As previously mentioned and discussed further below, migration system 30 enables computing device 14 to manage inventory for a migration. To this extent, migration system 30 is shown including a component system 32 for obtaining inventory data 50 for one or more migration components for the migration and a forecast system 34 for obtaining forecast data 52 for the one or more migration components. In general, a value for a migration variable, such as a forecast variable or an inventory variable, may be modified several times during the migration. To this extent, component system 32 and/or forecast system 34 can further generate history data 60 based on each modification. To assist in the management of the inventory of each migration component, migration system 30 is shown including a management system 36 for generating a management display and an audit system 38 for generating an activity display based on history data 60.

Additionally, computing device 14 is shown including an inventory system 40 for managing inventory data 50 (e.g., shipping and receiving) for an entity. Inventory system 40 can send and/or receive data to/from migration system 30 as described further below. Operation of each of these systems is discussed further below. However, it is understood that some of the various systems shown in FIG. 1 can be implemented independently, combined, and/or stored in memory for one or more separate computing devices 14 that communicate over a network. Further, it is understood that some of the systems and/or functionality may not be implemented, or additional systems and/or functionality may be included as part of system 10.

Figure 2:
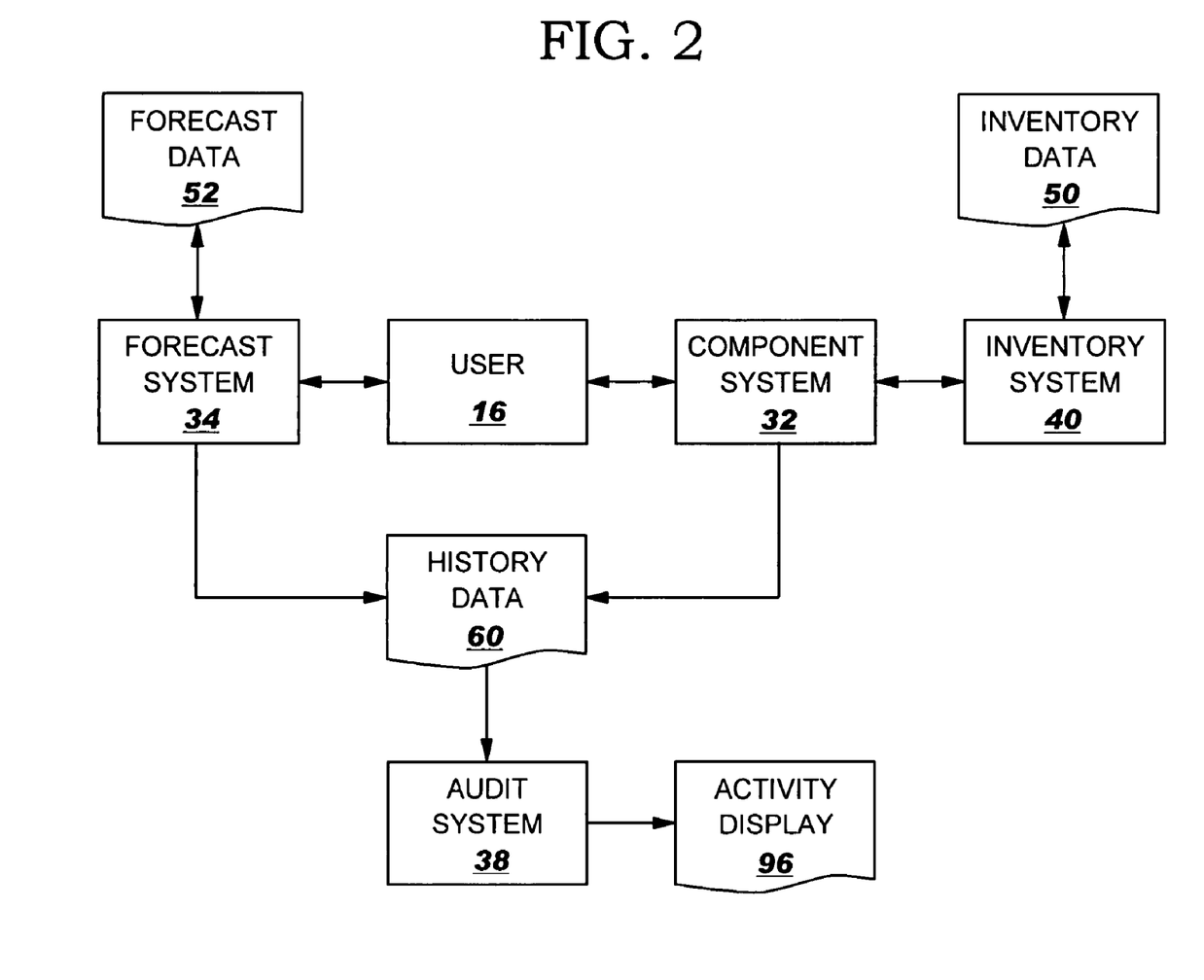
FIG. 2 shows an illustrative data flow diagram implemented by the system of FIG. 1.

As previously discussed, the invention provides a system and method for managing inventory for a migration using history data 60. To this extent, FIG. 2 shows an illustrative data flow diagram that can be implemented using the various systems shown in FIG. 1. In general, component system 32 can obtain a set (one or more) of migration components for the migration. In one embodiment, component system 32 can manage and display various displays to user 16 that allow user 16 to add, delete, modify, etc., migration components for the migration. Alternatively, component system 32 can retrieve and/or automatically determine the migration component(s) for the migration from data received from an external system or the like, as is known in the art.

In any event, component system 32 can obtain inventory data 50 for each migration component. In one embodiment, component system 32 requests inventory data 50 from an inventory system 40, which manages inventory data 50 for the entity. In response, inventory system 40 can provide component system 32 with inventory data 50. Inventory data 50 can comprise various information about the inventory of the corresponding migration component. For example, inventory data 50 can comprise a current inventory, e.g., an amount of the migration component that the entity possesses but has not yet deployed, an amount received/sent to/from one or more locations, etc.

Further, component system 32 can obtain and/or generate inventory data 50 without the use of inventory system 40. Similarly, forecast system 34 can obtain the set of migration components for the migration (e.g., from component system 32) and can obtain and/or generate forecast data 52 for each migration component. To this extent, as shown and described in a co-pending U.S. patent application identified by Attorney Docket No. END920040176US1, and entitled "Method and System for Managing Inventory for a Migration Using Forecast/Inventory Displays," which is hereby incorporated herein by reference, component system 32 and/or forecast system 34 can generate and/or display one or more displays to user 16 that allow user 16 to modify the value of one or more inventory variables and/or forecast variables (collectively referred to as "migration variables"), respectively. Subsequently, component system 32 and/or inventory system 34 can store the modified values as inventory data 50 and/or forecast data 52, respectively. Alternatively, inventory system 34 can provide the values of the inventory variable(s) to inventory system 40 for storage as inventory data 50.

Figure 3:
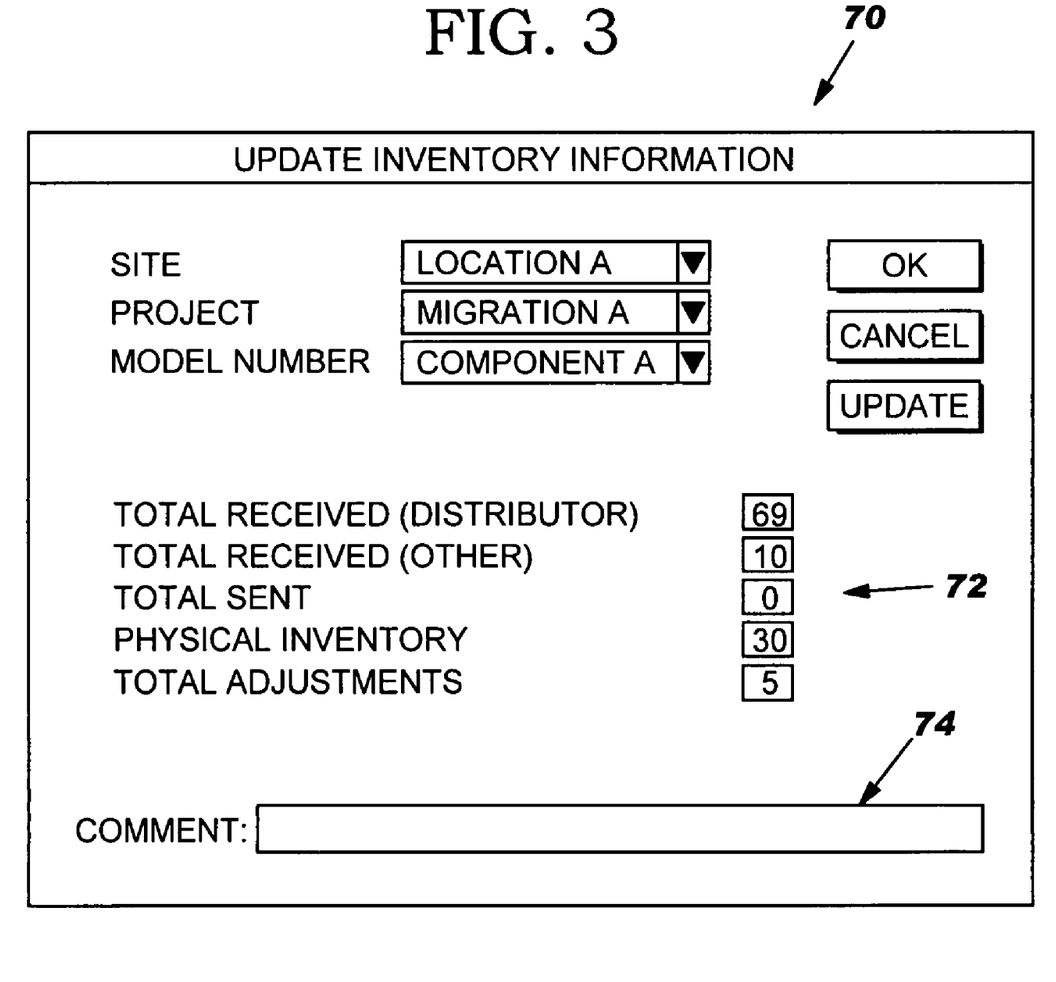
FIG. 3 shows an illustrative inventory update display.

Regardless, referring to FIGS. 2 and 3, in which FIG. 3 shows an illustrative inventory update display 70 that enables user 16 to modify one or more values for various inventory variables 72 for a selected migration component (COMPONENT A). After modifying one or more of the values, user 16 can select to implement the modification by, for example, selecting "OK" or "UPDATE" as is known in the art. In response, component system 32 can generate history data 60 based on the modification. In particular, component system 32 can obtain the modified value from inventory update display 70 and obtain a set (one or more) of modification attributes that are associated with the modification. Subsequently, component system 32 can generate a history record based on the set of modification attributes and store the history record as history data 60 for the migration.

Figure 4:
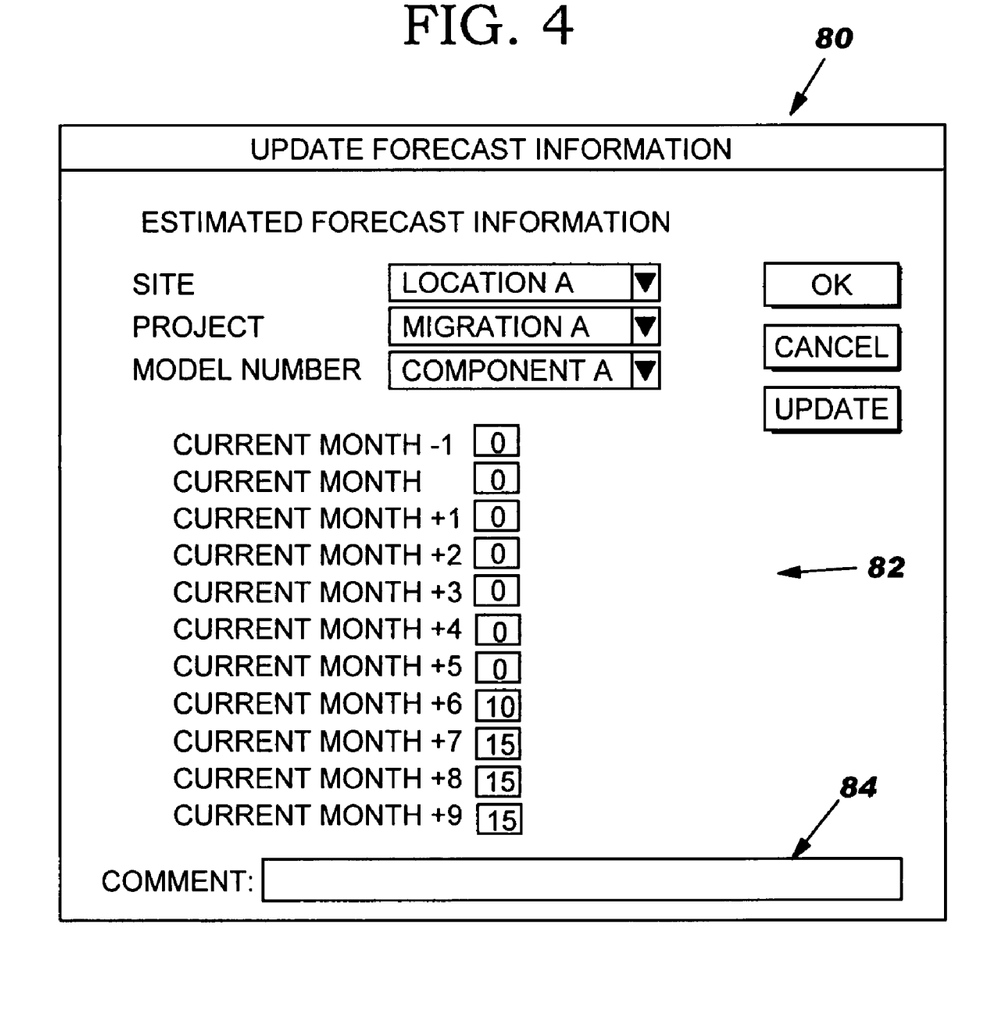
FIG. 4 shows an illustrative forecast update display.

Similarly, referring to FIGS. 2 and 4, in which FIG. 4 shows an illustrative forecast update display 80 that enables user 16 (FIG. 2) to modify one or more values for various forecast variables 82 for a selected migration component (COMPONENT A). After modifying one or more of the values, user 16 can select to implement the modification by, for example, selecting "OK" or "UPDATE" as is known in the art. In response, forecast system 34 can generate history data 60 based on the modification. In particular, forecast system 34 can obtain the modified value(s) from forecast update display 80 and obtain a set (one or more) of modification attributes that are associated with the modification. Subsequently, forecast system 34 can generate a history record based on the set of modification attributes and store the history record as history data 60 for the migration.

As previously mentioned, both component system 32 and forecast system 34 can obtain a set of modification attributes associated with the modification. Various modification attributes can be automatically obtained by component system 32 and/or forecast system 34. For example, component system 32 and/or forecast system 34 can automatically determine the selected migration component, the migration variable that was modified, the new value, a previous value, and the like. Further, component system 32 and/or forecast system 34 can automatically determine modification attributes of computing device 14 (FIG. 1), such as the time and/or date that the modification was requested (i.e., "timestamp"), an identification of computing device 14, and/or a geographical location of computing device 14, etc. Still further, component system 32 and/or forecast system 34 can automatically determine user data for the user 16 (FIG. 2) that requested the modification, such as user identification information (e.g., a user name). Additional information on user 16 could be obtained from another system (e.g., a personnel system), such as the individual's name, location, and/or position, etc.

Even further, user 16 can provide one or more modification attributes to component system 32 and/or forecast system 34. To this extent, inventory update display 70 of FIG. 3 is shown including a comment text box 74 and forecast update display 80 of FIG. 4 also is shown including a comment text box 84.

Comment text boxes 74, 84 allow user 16 to enter a comment regarding the corresponding modification(s). Subsequently, component system 32 and/or forecast system 34, respectively, can obtain the text of the comment, if any, and store it as a modification attribute. As shown in both FIGS. 3 and 4, user 16 could modify multiple values for inventory variables and forecast variables, respectively. In this case, component system 32 and/or forecast system 34 can generate a unique history record for each modified value. Alternatively, a single history record could be generated that includes all of the modified variables and corresponding values as modification attributes. In either case, it is understood that each history record can be stored using any known solution. For example, each history record could comprise one or more entries in one or more tables in a relational database.

Returning to FIG. 2, the invention uses history data 60 to manage an inventory for one or more migration components for the migration. In particular, inventory decisions (e.g., purchasing) are made based on inventory data 50 and/or forecast data 52 for each migration component. To this extent, history data 60 can provide details to user 16 regarding the evolution of the corresponding data during the migration, as well as enable user 16 to isolate and/or correct any errors that may be included in the data. Consequently, it is desirable that one or more users 16 that participate in managing the inventory for the migration component(s) be capable of viewing history data 60. To this extent, audit system 38 can generate an activity display 96 that includes some/all of the modification attributes for one or more history records.

Figure 5:
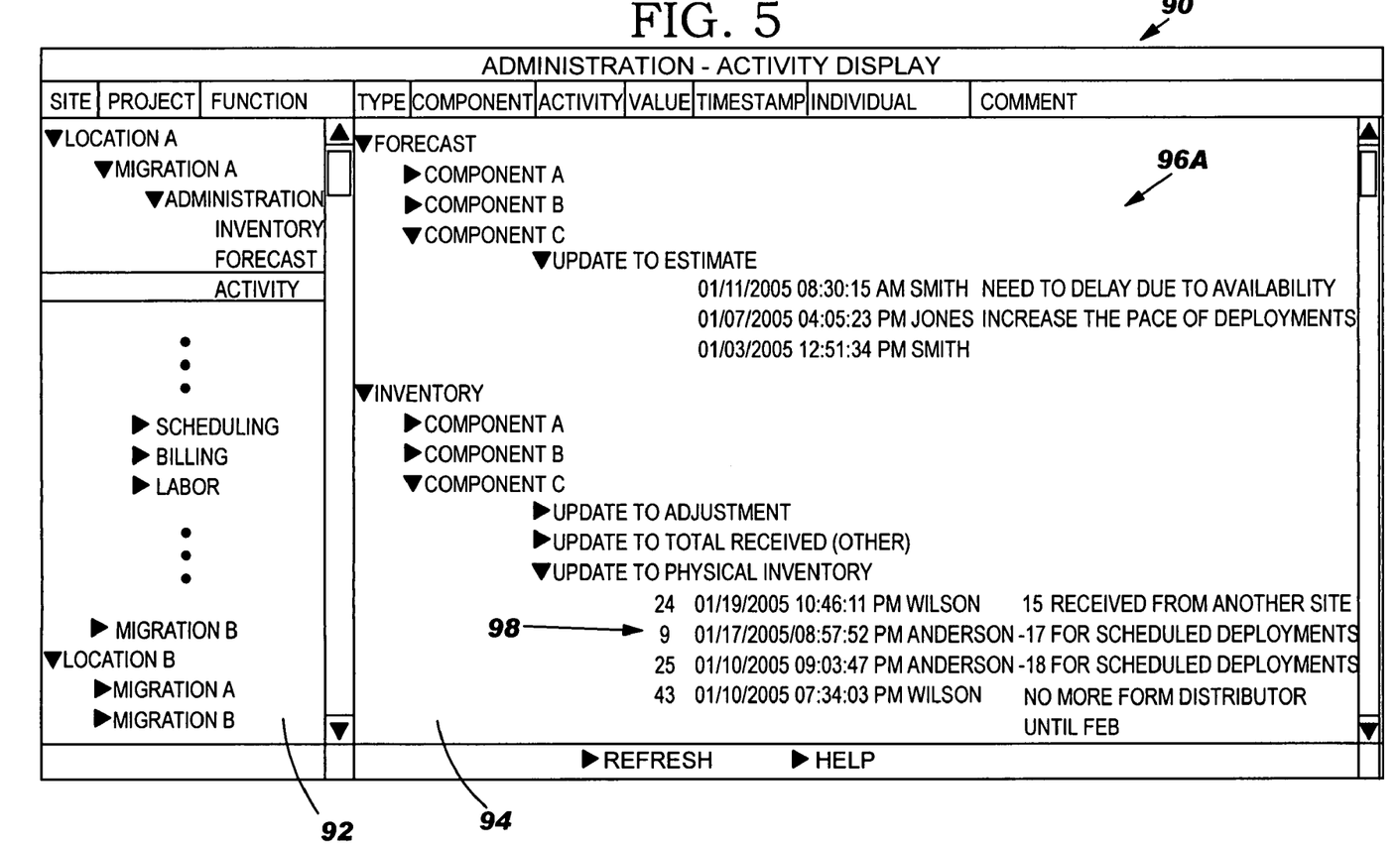
FIG. 5 shows an illustrative management display that includes an activity display.

For example, referring to both FIGS. 2 and 5, FIG. 5 shows an illustrative management display 90 that can be generated by management system 36 (FIG. 1). Subsequently, management system 36 can display (e.g., render) management display 90 to user 16 or management system 36 can provide management display 90 to another system for display to user 16. In any event, management display 90 includes a function selection area 92 that enables user 16 to select a desired management-related function for display in a main display area 94. In one embodiment, function selection area 92 includes a hierarchical structure that allows user 16 to readily navigate the various functions available and select a desired function for display in main display area 94. As shown, the hierarchical structure can allow user 16 to select one of a plurality of sites (e.g., LOCATION A, LOCATION B) and one of a plurality of projects (e.g., MIGRATION A, MIGRATION B) for the selected site. Subsequently, user 16 can be presented with a hierarchy that categorizes the various management functions available to the particular user 16.

In any event, once user selects a desired function in function selection area 92, management system 36 (FIG. 1) can generate a request for a display that corresponds to the selected function. To this extent, when user 16 selects the "ACTIVITY" administration function, management system 36 can generate a request for activity display 96A. Subsequently, audit system 38 can receive the request for activity display 96A and generate activity display 96A in response to the request. For example, audit system 38 can obtain a set (one or more) of history records from history data 60 and generate activity display 96A based on the set of history records.

As discussed previously, each history record can correspond to a modification that was made to a value of a migration variable, and can include a set of modification attributes that are associated with the particular modification. Audit system 38 can obtain the history records based on the data for one or more of the modification attributes. For example, the request received from management system 36 (FIG. 1) could include data for the site (LOCATION A) and project (MIGRATION A) for which the history records are desired. Audit system 38 can use this data to obtain only the relevant history records from history data 60.

Audit system 38 generates activity display 96A based on the set of history records. In particular, activity display 96A includes one or more of the modification attributes includes in one or more of the set of history records. In one embodiment, audit system 38 can generate one or more hierarchical structures to categorize the set of history records based on some of the modification attributes. For example, audit system 38 can generate two hierarchical structures, one for each possible migration variable type, e.g., FORECAST and INVENTORY. Audit system 38 can then add history records to one hierarchical structure or the other based on the modification attribute corresponding to the variable type. Each hierarchical structure can further categorize the history records based on one or more additional modification attributes.

Audit system 38 can generate activity display 96A based on the hierarchical structures. For example, each hierarchical structure shown in activity display 96A categorizes the set of history records by the migration component (e.g., COMPONENT A, COMPONENT B, COMPONENT C) corresponding to the modified migration variable and then by activity. In each case, the activity is determined based on the migration variable that was modified (e.g., ESTIMATE, ADJUSTMENT, etc.). In an alternative embodiment, the migration variable could be used itself for categorizing the set of history records. Regardless, the hierarchical structures shown in activity display 96A enable user 16 to selectively navigate the history records based on some of the modification attributes in order to locate and selectively display only the desired history record(s). However, it is understood that the hierarchical structures shown in function selection area 92 and activity display 96A are only illustrative. To this extent, additional and/or fewer levels, different combinations of attributes, etc., can be used to categorize and selectively navigate the set of history records under the present invention.

Audit system 38 can provide activity display 96A to management system 36, which can incorporate activity display 96A in main display area 94. Subsequently, user 16 can navigate the hierarchical structures to locate a desired set of history records. Once user 16 has located the desired set of history records, activity display 96A can display various modification attributes for the set of history records. For example, activity display 96A is shown including a value (if available) for each history record, a timestamp for the modification, an individual (e.g., user identification) that performed the modification, and a comment (if available) regarding the modification. As noted above, activity display 96A can be used to manage inventory of one or more migration components for a migration. To this extent, user 16 can view activity display 96A to determine the cause of a discrepancy in the physical inventory of a particular migration component. For example, the physical inventory of COMPONENT C may be one less than the stored physical inventory value indicates should be present. User 16 could view activity display 96A and, based on the value and the corresponding comment for history record 98 along with the value for the previous history record, determine that a mathematical error in the new value entered for history record 98 may be responsible for the discrepancy.

Figure 6:
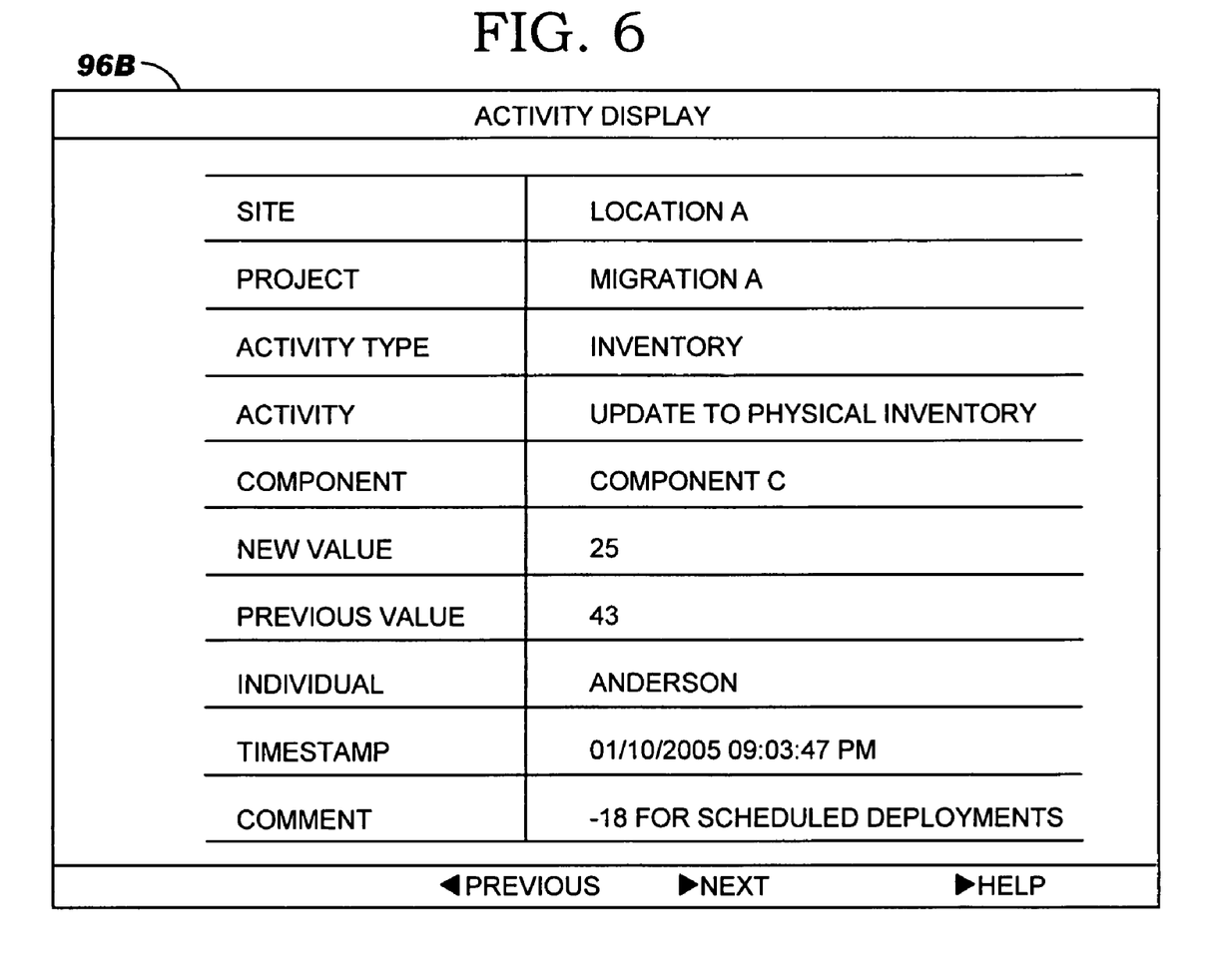
FIG. 6 shows an alternative activity display.

Management display 90, main display area 94, and activity display 96A are only illustrative of various solutions for displaying and/or navigating the set of history records. For example, FIG. 6 shows an alternative activity display 96B according to another embodiment of the invention. In this case, the modification attributes for a single history record can be displayed in a table format or the like, apart from other content. Further, user 16 can navigate to a next or previous history record using navigation interfaces (e.g., PREVIOUS and NEXT) that can be included in activity display 96B. In any event, it is understood that activity displays 96A-B are only illustrative and various alternatives are possible under the present invention.

While shown and described herein as a method and system for managing inventory for a migration, it is understood that the invention further provides various alternative embodiments. For example, in one embodiment, the invention provides a computer-readable medium that includes computer program code to enable a computer infrastructure to manage inventory for a migration. To this extent, the computer-readable medium includes program code, such as migration system 30 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 29 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage inventory for a migration as described above. In this case, the service provider can create, maintain, support, etc., a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method of generating a system for managing inventory for a migration. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing inventory for an information technology migration, the method comprising:
    obtaining at least one migration component for the migration,
        wherein the at least one migration component comprises at least one hardware or software component to be migrated, and
        wherein the migration comprises one of: a change from a first hardware technology to a second hardware technology, and a change from a first software technology to a second software technology,
        the migration further comprising receiving the at least one migration component into inventory, and deploying the migration component to a target;
    obtaining a set of history records for a migration variable for the at least one migration component,
        wherein each history record in the set of history records corresponds to a unique modification of a value of the migration variable during the migration and includes a set of modification attributes associated with the unique modification; and
    generating an activity display for the migration, wherein the activity display includes the set of modification attributes for at least one of the set of history records.

2. The method of claim 1, wherein the obtaining a set of history records step includes:
    obtaining the unique modification of the value;
    obtaining the set of modification attributes associated with the unique modification;
    generating a history record based on the set of modification attributes; and
    storing the history record as history data for the migration.

3. The method of claim 1, wherein the obtaining a set of history records step includes:
    receiving a request for the set of history records corresponding to the migration variable; and
    obtaining the set of history records from history data for the migration.

4. The method of claim 1, wherein the migration variable comprises at least one of a forecast variable and an inventory variable for the at least one migration component.

5. The method of claim 1, further comprising generating a hierarchical structure for categorizing the set of history records, wherein the activity display is generated based on the hierarchical structure.

6. The method of claim 5, wherein the hierarchical structure categorizes the set of history records based on at least one of a migration component, a migration variable, and a variable type.

7. The method of claim 1, further comprising displaying the activity display to a user.

8. The method of claim 1, further comprising generating a system for managing inventory for a migration, the method comprising:
    obtaining a computer infrastructure; and deploying a means to the computer infrastructure for performing the steps of: obtaining the set of history records, generating at least one hierarchical structure, and generating an activity display.

9. The method of claim 1, further comprising using a computer-readable medium for enabling a computer infrastructure to manage inventory for a migration, the computer-readable medium comprising computer program code for performing the method steps of obtaining the set of history records, generating at least one hierarchical structure, and generating an activity display.

10. A method of managing inventory for an information technology migration, the method comprising:
   obtaining a set of history records for the migration,
      wherein the migration comprises one of: a change from a first hardware technology to a second hardware technology, and a change from a first software technology to a second software technology, and
      wherein each history record in the set of history records comprises a plurality of modification attributes associated with a unique modification of a value of a migration variable during the migration;
   generating at least one hierarchical structure for categorizing the set of history records based on at least some of the plurality of modification attributes; and
   generating an activity display based on the at least one hierarchical structure.

11. The method of claim 10, wherein the obtaining step includes:
   obtaining the unique modification of the value;
   obtaining the set of modification attributes associated with the unique modification;
   generating a history record based on the set of modification attributes; and
   storing the history record as history data for the migration.

12. The method of claim 10, wherein the at least some of the plurality of modification attributes includes a migration component corresponding to the migration variable.

13. The method of claim 10, wherein the at least some of the plurality of modification attributes includes the migration variable.

14. The method of claim 10, wherein the at least some of the plurality of modification attributes includes a variable type.

15. The method of claim 10, wherein the plurality of modification attributes include the modified value, a timestamp, and user data.

16. The method of claim 10, wherein the plurality of modification attributes for at least one of the set of history records includes a comment.

17. The method of claim 10, further comprising displaying the activity display to a user.

18. The method of claim 10, further comprising generating a system for managing inventory for a migration, the method comprising:
   obtaining a computer infrastructure; and
   deploying a means to the computer infrastructure for performing the obtaining a set of history records for the migration, generating at least one hierarchical structure for categorizing the set of history records, and generating an activity display.

19. The method of claim 10, further comprising using a computer-readable medium for enabling a computer infrastructure to manage inventory for a migration, the computer-readable medium comprising computer program code for performing the method steps of obtaining a set of history records for the migration, generating at least one hierarchical structure for categorizing the set of history records, and generating an activity display.

20. A computer system for managing inventory for an information technology migration, the system comprising:
   at least one processing unit;
      a memory operably associated with the at least one processing unit; and
      an inventory migration management system storable in memory and executable by the at least one processing unit, the inventory migration management system comprising:
         a system for obtaining a set of history records for a migration variable for at least one migration component,
            wherein the at least one migration component comprises at least one hardware or software component to be migrated,
            wherein the information technology migration comprises one of: a change from a first hardware technology to a second hardware technology, and a change from a first software technology to a second software technology, and
            wherein each history record in the set of history records corresponds to a unique modification of a value of the migration variable during the migration and includes a set of modification attributes associated with the unique modification; and
         a system for generating an activity display for the migration, wherein the activity display includes the set of modification attributes for at least one of the set of history records.

21. The computer system of claim 20, further comprising a system for obtaining the at least one migration component for the migration.

22. The computer system of claim 20, wherein the migration variable comprises a forecast variable, the system further comprising a system for generating a history record based on a modification of the forecast variable.

23. The computer system of claim 20, wherein the migration variable comprises an inventory variable, the system further comprising a system for generating a history record based on a modification of the inventory variable.

24. The computer system of claim 20, further comprising a system for generating a hierarchical structure for categorizing the set of history records, wherein the activity display is generated based on the hierarchical structure.

25. The computer system of claim 20, further comprising a system for displaying the activity display to a user.

26. The computer system of claim 20, wherein the system for obtaining includes a system for obtaining the set of modification attributes associated with the unique modification.

27. The computer system of claim 26, wherein the set of modification attributes include the migration component, the migration variable, the modified value, a timestamp, and user data.

28. The computer system of claim 27, wherein the set of modification attributes further includes a comment.

29. A program product stored on a computer-readable medium, which when executed, manages inventory for an information technology migration, the program product comprising:
   program code for obtaining a set of history records for a migration variable for at least one migration component, wherein the at least one migration component comprises at least one hardware or software component to be migrated, wherein the information technology migration comprises one of: a change from a first hardware technology to a second hardware technology, and a change from a first software technology to a second software technology, and wherein each history record in the set of history records corresponds to a unique modification of a value of the migration variable during the migration and includes a set of modification attributes associated with the unique modification; and program code for generating an activity display for the migration, wherein the activity display includes the set of modification attributes for at least one of the set of history records.

* * * * *